(12) United States Patent
Chun

(10) Patent No.: US 9,940,782 B2
(45) Date of Patent: *Apr. 10, 2018

(54) ELECTRONIC GAMING DEVICE

(71) Applicant: FRESH IDEA GLOBAL LIMITED, Hong Kong (HK)

(72) Inventor: Jay Chun, Hong Kong (CN)

(73) Assignee: Fresh Idea Global Limited, Hong Kong (HK)

( * ) Notice: Subject to any disclaimer, the term of this patent is extended or adjusted under 35 U.S.C. 154(b) by 0 days.

This patent is subject to a terminal disclaimer.

(21) Appl. No.: 15/441,184

(22) Filed: Feb. 23, 2017

(65) Prior Publication Data

US 2017/0161988 A1 Jun. 8, 2017

Related U.S. Application Data

(63) Continuation of application No. 13/542,446, filed on Jul. 5, 2012, now Pat. No. 9,592,450, which is a continuation-in-part of application No. 13/456,110, filed on Apr. 25, 2012, now Pat. No. 9,595,166.

(51) Int. Cl.
*G07F 17/32* (2006.01)
*A63F 13/77* (2014.01)
*A63F 1/00* (2006.01)

(52) U.S. Cl.
CPC .......... *G07F 17/3227* (2013.01); *A63F 13/77* (2014.09); *G07F 17/322* (2013.01); *G07F 17/3246* (2013.01); *G07F 17/3248* (2013.01); *G07F 17/3288* (2013.01);
(Continued)

(58) Field of Classification Search
CPC .. G07F 17/32; G07F 17/3225; G07F 17/3227; G07F 17/3244; G07F 17/3248; G07F 17/326; G07F 17/3288; G07F 17/3293; G07F 17/3246; G07F 17/322;
(Continued)

(56) References Cited

U.S. PATENT DOCUMENTS

| 5,083,271 | A | 1/1992 | Thacher et al. |
| 5,347,061 | A | 9/1994 | Harandi et al. |
| 5,472,194 | A | 12/1995 | Breeding et al. |

(Continued)

FOREIGN PATENT DOCUMENTS

| CN | 101244335 | 8/2008 |
| CN | 101513571 | 8/2009 |

(Continued)

OTHER PUBLICATIONS

Office Action for U.S. Appl. No. 13/948,101, dated Dec. 16, 2013.
(Continued)

*Primary Examiner* — Jasson Yo

(57) ABSTRACT

Examples disclosed herein relate to systems and methods, which may receive gaming data from one or more gaming tables. The systems and methods may obtain gaming data from one or more gaming tables via a network interface based on at least one of a searching structure and a search algorithm. The systems and methods may compare betting criterion to the gaming data. The systems and methods may initiate at least one of a wager based on a comparison of the betting criterion to the gaming data and a display of data related to a search result.

29 Claims, 9 Drawing Sheets

(52) U.S. Cl.
CPC .... *G07F 17/3293* (2013.01); *A63F 2001/001* (2013.01); *A63F 2001/003* (2013.01)

(58) Field of Classification Search
CPC ................ A63F 13/77; A63F 2001/001; A63F 2001/003
See application file for complete search history.

(56) References Cited

U.S. PATENT DOCUMENTS

| | | |
|---|---|---|
| 5,605,334 A | 2/1997 | McCrea |
| 5,768,382 A | 6/1998 | Schneier et al. |
| 5,851,011 A | 12/1998 | Lott |
| 5,917,725 A | 6/1999 | Thacher et al. |
| 5,970,143 A | 10/1999 | Schneier et al. |
| 6,165,069 A | 12/2000 | Sines et al. |
| 6,331,148 B1 | 12/2001 | Krause |
| 6,361,044 B1 | 3/2002 | Block |
| 6,508,709 B1 | 1/2003 | Karmarkar |
| 6,671,358 B1 | 12/2003 | Seidman et al. |
| 6,886,829 B2 | 5/2005 | Hessing et al. |
| 6,991,544 B2 | 1/2006 | Soltys et al. |
| 7,008,322 B1 | 3/2006 | Suzuki et al. |
| 7,040,982 B1 | 5/2006 | Jarvis |
| 7,206,762 B2 | 4/2007 | Sireau |
| 7,233,922 B2 | 6/2007 | Asher |
| 7,553,233 B2 | 6/2009 | Jarvis et al. |
| 7,566,268 B2 | 7/2009 | Asher |
| 7,566,270 B2 | 7/2009 | Amaitis |
| 7,604,537 B2 | 10/2009 | Amaitis |
| 7,637,506 B2 | 12/2009 | Naicker |
| 7,684,874 B2 | 3/2010 | Schlottmann et al. |
| 7,690,996 B2 | 4/2010 | Iddings et al. |
| 7,711,628 B2 | 5/2010 | Davie |
| 7,727,060 B2 | 6/2010 | Mills |
| 7,731,586 B2 | 6/2010 | Letovsky et al. |
| 7,783,542 B2 | 8/2010 | Horowitz |
| 7,783,552 B2 | 8/2010 | Assia |
| 7,798,895 B2 | 9/2010 | Jubinville et al. |
| 8,052,526 B2 | 11/2011 | Abbott et al. |
| 8,070,583 B2 | 12/2011 | Baerlocher et al. |
| 8,150,157 B2 | 4/2012 | Downs et al. |
| 8,257,166 B2 | 9/2012 | Kido |
| 8,262,090 B2 | 9/2012 | Soltys et al. |
| 8,282,489 B2 | 10/2012 | Azerina et al. |
| 8,348,278 B2 | 1/2013 | Tseng |
| 8,444,148 B1 | 5/2013 | Tseng |
| 8,469,788 B2 | 6/2013 | Carpenter et al. |
| 8,590,895 B2 | 11/2013 | Kwon |
| 8,808,077 B1 | 8/2014 | Chun |
| 8,920,229 B1 | 12/2014 | Chun |
| 9,292,996 B2 | 3/2016 | Davis et al. |
| 9,311,773 B2 | 4/2016 | Chung |
| 9,592,450 B2 * | 3/2017 | Chun ................. G07F 17/3227 |
| 9,595,166 B2 * | 3/2017 | Chun ................. G07F 17/3248 |
| 2002/0094869 A1 | 7/2002 | Harkham |
| 2002/0147042 A1 | 10/2002 | Shinners et al. |
| 2002/0151366 A1 | 10/2002 | Walker et al. |
| 2003/0137110 A1 | 7/2003 | Huard et al. |
| 2003/0195841 A1 | 10/2003 | Ginsberg |
| 2004/0121839 A1 | 6/2004 | Web |
| 2004/0204232 A1 | 10/2004 | Asher |
| 2005/0043094 A1 | 2/2005 | Nguyen et al. |
| 2005/0165669 A1 | 7/2005 | Montanaro |
| 2005/0197938 A1 | 9/2005 | Davie |
| 2005/0197948 A1 | 9/2005 | Davie |
| 2006/0058082 A1 | 3/2006 | Crawford et al. |
| 2006/0058083 A1 | 3/2006 | Crawford et al. |
| 2006/0058084 A1 | 3/2006 | Crawford et al. |
| 2006/0058085 A1 | 3/2006 | White et al. |
| 2006/0058086 A1 | 3/2006 | White et al. |
| 2006/0058087 A1 | 3/2006 | White et al. |
| 2006/0058088 A1 | 3/2006 | Crawford et al. |
| 2006/0058089 A1 | 3/2006 | White et al. |
| 2006/0058090 A1 | 3/2006 | Crawford et al. |
| 2006/0058091 A1 | 3/2006 | Crawford et al. |
| 2006/0058092 A1 | 3/2006 | Crawford et al. |
| 2006/0058093 A1 | 3/2006 | White et al. |
| 2006/0066052 A1 | 3/2006 | White et al. |
| 2006/0068498 A1 | 3/2006 | White et al. |
| 2006/0068864 A1 | 3/2006 | White et al. |
| 2006/0068865 A1 | 3/2006 | White et al. |
| 2006/0068866 A1 | 3/2006 | White et al. |
| 2006/0068868 A1 | 3/2006 | Crawford et al. |
| 2006/0068869 A1 | 3/2006 | White et al. |
| 2006/0068870 A1 | 3/2006 | Crawford et al. |
| 2006/0068871 A1 | 3/2006 | Crawford et al. |
| 2006/0068879 A1 | 3/2006 | Crawford et al. |
| 2006/0068899 A1 | 3/2006 | White et al. |
| 2006/0094493 A1 | 5/2006 | Kido |
| 2006/0100019 A1 | 5/2006 | Hornik et al. |
| 2006/0105839 A1 | 5/2006 | Graeve |
| 2006/0217199 A1 | 9/2006 | Adcox et al. |
| 2006/0264252 A1 | 11/2006 | White et al. |
| 2006/0287066 A1 | 12/2006 | Crawford et al. |
| 2006/0287067 A1 | 12/2006 | White et al. |
| 2006/0287101 A1 | 12/2006 | Crawford et al. |
| 2006/0287102 A1 | 12/2006 | White et al. |
| 2006/0287103 A1 | 12/2006 | Crawford et al. |
| 2006/0287104 A1 | 12/2006 | White et al. |
| 2007/0015583 A1 | 1/2007 | Tran |
| 2007/0060259 A1 | 3/2007 | Pececnik |
| 2007/0087832 A1 | 4/2007 | Abbott et al. |
| 2007/0090595 A1 | 4/2007 | Csikos |
| 2007/0129138 A1 | 6/2007 | Amaitis |
| 2007/0178955 A1 | 8/2007 | Mills |
| 2007/0259709 A1 | 11/2007 | Kelly et al. |
| 2008/0045344 A1 | 2/2008 | Schlottmann et al. |
| 2008/0081685 A1 | 4/2008 | Naftaly |
| 2008/0108404 A1 | 5/2008 | Iddings et al. |
| 2008/0113767 A1 | 5/2008 | Nguyen et al. |
| 2008/0200242 A1 | 8/2008 | Ginsberg |
| 2008/0248849 A1 * | 10/2008 | Lutnick ................. G07F 17/32 463/16 |
| 2008/0248864 A1 | 10/2008 | Toyoda |
| 2009/0005165 A1 | 1/2009 | Arezina |
| 2009/0124323 A1 | 5/2009 | Dunn et al. |
| 2009/0131151 A1 | 5/2009 | Harris et al. |
| 2009/0280904 A1 | 11/2009 | Nicely et al. |
| 2009/0291762 A1 | 11/2009 | Walter |
| 2009/0325686 A1 * | 12/2009 | Davis ..................... G07F 17/32 463/25 |
| 2010/0087241 A1 | 4/2010 | Nguyen et al. |
| 2010/0150460 A1 | 4/2010 | Makhoul et al. |
| 2010/0234099 A1 | 9/2010 | Rasmussen |
| 2010/0331085 A1 | 12/2010 | Nagano |
| 2011/0111833 A1 | 5/2011 | Nordahl |
| 2011/0294561 A1 | 12/2011 | Shaw et al. |
| 2011/0300917 A1 | 12/2011 | Hill |
| 2012/0049447 A1 | 3/2012 | Klein |
| 2012/0049455 A1 | 3/2012 | Yap et al. |
| 2012/0083909 A1 | 4/2012 | Carpenter et al. |
| 2012/0214575 A1 * | 8/2012 | Amaitis ................. G06Q 50/34 463/25 |
| 2012/0252564 A1 | 10/2012 | Moore et al. |
| 2012/0329551 A1 | 12/2012 | Arerina et al. |
| 2013/0005456 A1 | 1/2013 | Okujo et al. |
| 2013/0079147 A1 | 3/2013 | Merati |
| 2013/0116031 A1 | 5/2013 | Carpenter et al. |
| 2013/0134672 A1 | 5/2013 | Okuaki |
| 2013/0225276 A1 | 8/2013 | Au-Yeung |
| 2013/0244765 A1 | 9/2013 | Arnone et al. |
| 2013/0281197 A1 | 10/2013 | Carpenter et al. |
| 2013/0288764 A1 | 10/2013 | Chun |
| 2013/0288779 A1 | 10/2013 | Chun |
| 2013/0296031 A1 | 11/2013 | Arnone et al. |
| 2013/0341862 A1 | 12/2013 | Tokue |
| 2014/0187306 A1 | 7/2014 | Nordahl |
| 2014/0256392 A1 | 9/2014 | Jones |
| 2014/0274252 A1 | 9/2014 | Chun |
| 2014/0274253 A1 | 9/2014 | Chun |
| 2015/0024818 A1 | 1/2015 | Chun |
| 2015/0332552 A1 | 11/2015 | Chun |

(56) References Cited

U.S. PATENT DOCUMENTS

2016/0292954 A1 10/2016 Sugai et al.
2017/0161988 A1 6/2017 Nguyen
2017/0161993 A1 6/2017 Nguyen

FOREIGN PATENT DOCUMENTS

| CN | 102580306 | 7/2012 |
|---|---|---|
| EP | 1939826 A2 | 7/2008 |
| TW | 201138907 A1 | 11/2011 |

OTHER PUBLICATIONS

Cantor Fitzgerald Hopes to Bring Spread Betting to Las Vegas Casinos, Dec. 14, 2009.
Financial Spread Betting, Apr. 26, 2012.
High-Speed Traders Set Their Sights on Asia and Latin America, Aug. 12, 2010.
Office Action for U.S. Appl. No. 13/456,110, dated Jun. 11, 2013.
Final Office Action for U.S. Appl. No. 13/456,110, dated Dec. 24, 2013.
Office Action for U.S. Appl. No. 14/017,071, dated Nov. 7, 2013.
Notice of Allowance for U.S. Appl. No. 14/017,071, dated Jan. 24, 2014.
Office Action for U.S. Appl. No. 14/017,073, dated Dec. 10, 2013.
Final Office Action for U.S. Appl. No. 13/948,101, dated Apr. 23, 2014.
Notice of Allowance for U.S. Appl. No. 14/017,073, dated May 20, 2014.
Office Action for U.S. Appl. No. 14/095,882, dated Aug. 14, 2014.
Office Action for U.S. Appl. No. 13/456,110, dated Sep. 12, 2014.
Office Action for U.S. Appl. No. 13/542,446, dated Sep. 10, 2014.
Office Action for U.S. Appl. No. 14/197,683, dated Aug. 4, 2014.
Office Action for U.S. Appl. No. 14/174,701, dated Mar. 12, 2015.
Final Office Action for U.S. Appl. No. 13/542,446, dated Mar. 25, 2015.
Final Office Action for U.S. Appl. No. 13/456,110, dated Apr. 22, 2015.
Office Action for U.S. Appl. No. 13/456,110, dated Jan. 13, 2016.
Final Office Action for U.S. Appl. No. 13/542,446, dated Jan. 4, 2016.
Office Action for U.S. Appl. No. 15/094,827, dated Sep. 22, 2016.
Notice of Allowance for U.S. Appl. No. 13/456,110, dated Nov. 16, 2016.
Notice of Allowance for U.S. Appl. No. 13/542,446, dated Nov. 16, 2016.
Office Action for U.S. Appl. No. 14/692,623, dated Oct. 5, 2016.
Office Action for U.S. Appl. No. 14/318,426, dated Sep. 11, 2015.
Notice of Allowance for U.S. Appl. No. 14/318,426, dated Dec. 8, 2015.
Office Action for U.S. Appl. No. 14/508,922, dated Jan. 30, 2017.
Final Office Action for U.S. Appl. No. 14/692,623, dated Mar. 24, 2017.
Notice of Allowance for U.S. Appl. No. 14/692,623, dated Jun. 30, 2017.
Restriction Requirement for U.S. Appl. No. 14/692,623, dated Sep. 6, 2016.
Office Action for U.S. Appl. No. 15/094,827, dated Sep. 13, 2017.

\* cited by examiner

ELECTRONIC GAMING DEVICE

CROSS-REFERENCE TO RELATED PATENT APPLICATIONS

This application is a continuation of U.S. application Ser. No. 13/542,446, filed Jul. 5, 2012, and entitled "ELECTRONIC GAMING DEVICE," which is hereby incorporated herein by reference, which is a continuation-in-part of U.S. application Ser. No. 13/456,110, filed on Apr. 25, 2012, entitled "Electronic Gaming Device," pending, which is hereby expressly incorporated by reference in its entirety.

BACKGROUND

Field

The subject matter disclosed herein relates to an electronic gaming device. More specifically, the disclosure relates to an electronic gaming device which provides gaming options based on predetermined betting structures relating to future game play results.

Information:

The gaming industry has numerous casinos located both worldwide and in the United States. A client of a casino or other gaming entity can gamble via various games of chance. For example, craps, roulette, baccarat, blackjack, and Sic Bo are table games where a person may gamble on an outcome.

A player may bet on a single game outcome, such as, whether the banker or the player will win during a baccarat game. In another example, a player may place a wager on whether their blackjack score will beat the dealer's blackjack score. The player can have more than one hand/position. However, the player can only wager on one game event at a time. For example, a player cannot wager that the next five baccarat game outcome will be that the banker wins. Further, the number of seats at a table game is limited. Therefore, a player may have to wait for a seat to open to play the game, which reduces the players' playing time and the gaming entity's opportunity to generate income.

SUMMARY

In one embodiment, an electronic gaming device includes a memory and a processor. The memory includes a searching module. The searching module includes one or more of a plurality of predetermined searching structures and a search algorithm. The processor may obtain gaming data from one or more gaming tables via a network interface based on at least one of a searching structure and a search algorithm. The processor may compare a betting criterion to the gaming data. The processor may initiate at least one of a wager based on a comparison of the betting criterion to the gaming data and a display of data related to a search result.

In another embodiment, a method of providing gaming options via an electronic gaming device includes obtaining gaming data from one or more gaming tables. The method may include comparing a betting criterion to the gaming data and initiating at least one of a wager based on a comparison of the betting criterion to the gaming data and a display of data related to a search result.

In yet another embodiment, an electronic gaming device may include a memory and a processor. The memory may include a searching module. The searching module may include at least one of a plurality of predetermined searching structures and a search algorithm. The processor may obtain gaming data from one or more gaming tables via a network interface based on at least one of a searching structure and the search algorithm. The processor may compare a betting criterion to the gaming data. The electronic gaming device may include a display, which may display betting options based on a comparison of the betting criterion to the gaming data.

BRIEF DESCRIPTION OF THE FIGURES

Non-limiting and non-exhaustive examples will be described with reference to the following figures, wherein like reference numerals refer to like parts throughout the various figures.

DETAILED DESCRIPTION

Figure 1:
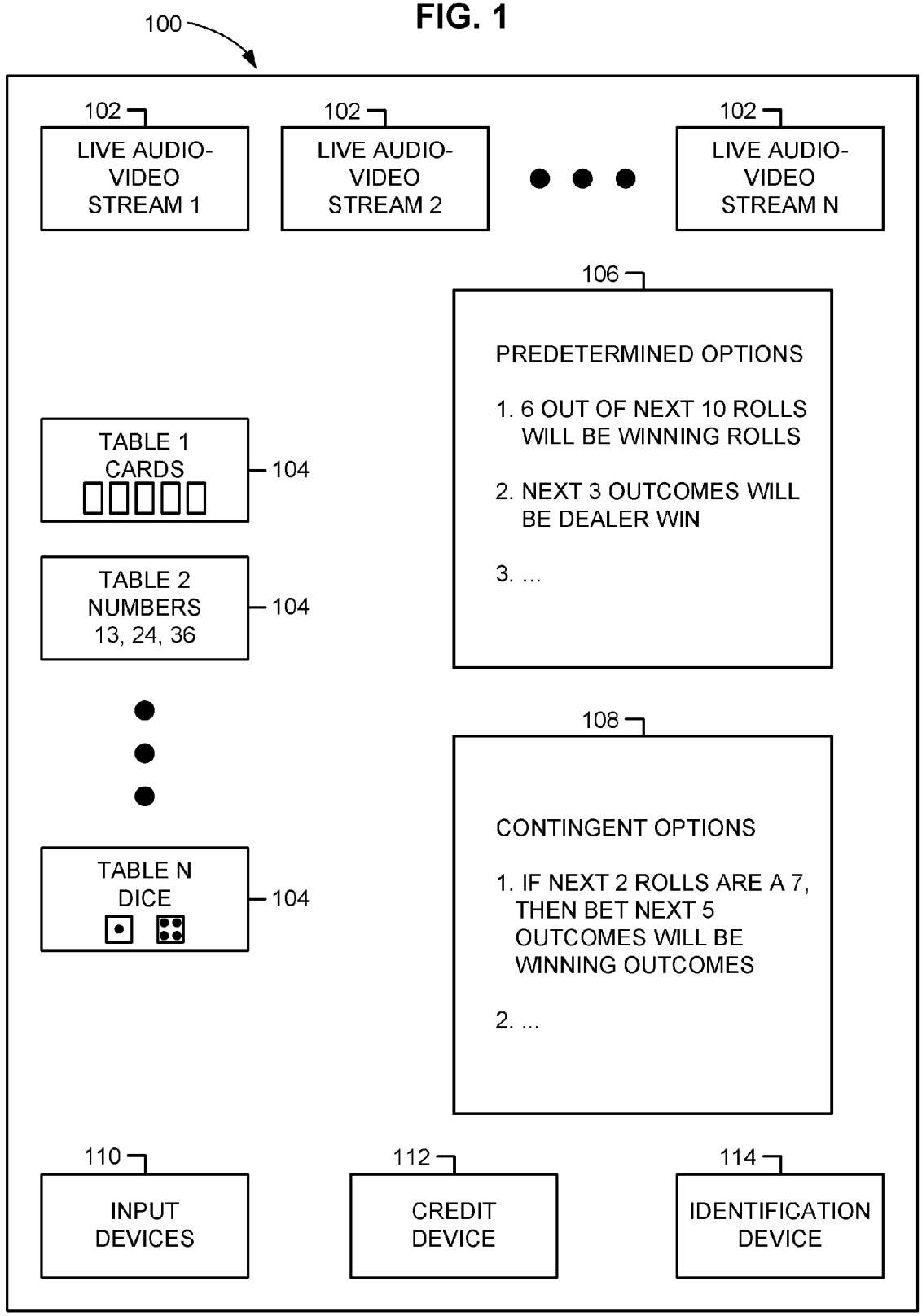
FIG. 1 is an illustration of the electronic gaming device, according to one embodiment.

FIG. 1 is an illustration of an electronic gaming device 100. Electronic gaming device 100 may include live video streams 102, images from table games 104, predetermined gaming options 106, contingent gaming options 108, input devices 110, a credit device 112, and an identification device 114. Electronic gaming device 100 may display one, two, a few, or a plurality of video streams 102, which may be obtained from one or more gaming tables, a central server, a video server, another data source, and/or any combination thereof. For example, video streams may be obtained from one or more baccarat tables, roulette tables, blackjack tables, poker tables, craps tables, and Sic Bo tables. These video streams may be obtained by cameras placed on the tables, on a person, on the walls, on the ceilings, any other location that allows for video streams to be obtained, and/or any combination thereof.

These video streams may display any gaming objects such as cards, card shoe, dice, balls, dominos, a dealer, a wheel, chips, electronic displays, any other items and/or person around the gaming table, and/or any combination thereof. For example, a video stream may display a dealer dealing cards in a blackjack game. The displayed cards may be one or more players' cards and/or the dealers' cards. In another example, a video stream may display the wheel of a roulette table and the ball going around the wheel until the ball lands on a resting spot (e.g., the space labeled 26). In another embodiment, a video stream may be of cards in a poker game where these cards are one or more players' cards and/or the community cards. The video stream may display cards in a baccarat game, such as, the player's cards and/or the banker's cards. Further, the video stream may display a bet size for one or more players and/or the betting positions (e.g., betting on a dealer win, a hard eight, pass, no pass, a red outcome, a black outcome, a craps, etc.) for one or more players.

Video streams may be obtained for an entertainment event, a wagering event, a promotional event, a promotional offering, an advertisement, a sporting event, any other event, and/or any combination thereof. For example, the entertainment event may be a concert, a show, a television program, a movie, an internet event, and/or any combination thereof. In another example, the wagering event may be a poker tournament, a horse race, a car race, and/or any combination thereof. The advertisement may be an advertisement for the casino, a restaurant, a shop, any other entity, and/or any combination thereof. The sporting event may be a football game, a baseball game, a hockey game, a basketball game, any other sporting event, and/or any combination thereof. All of these video streams may be utilized in combination with the gaming table video streams.

Images from table games 104 may be video or graphical representation of gaming objects such as cards, card shoe, numbers, dice, dominos, a wheel, chips, and/or any combination thereof. For example, an animation of a card may represent an actual card being drawn at a blackjack table, a baccarat table, a poker table, and/or any card table. The animation may include one or more previous cards drawn, along with the most recently drawn card. In another example, the animation may be of a wheel on a roulette table, which shows the ball moving around the wheel until the ball lands on the balls' final spot (e.g., number 26). The animation may represent the actual movement of the ball around the wheel. The animation may be an illustration of a ball moving, which does not follow the actual movement of the ball around the wheel. Further, the animation may be of dice rolling across a craps table and generating an outcome of the number 7 (e.g., the first dice=4 and the second dice=3). The animation may represent the actual movement of the dice. The animation may be an illustration of the dice moving, which does not follow the actual movement of the dice. In another example, the animation may be of dominos with a first domino having a top which equals a 6 and a bottom which equals a 1 and a second domino having a top which equals a 3 and a bottom which equals a 2.

Predetermined gaming options 106 may be gaming options, which relate to outcomes for more than one gaming event and/or gambling event. For example, a player may select a wagering option that 6 out of the next 10 rolls on a craps table will result in certain outcomes (e.g., win, lose, hard numbers, craps, and/or a specific number). Based on predetermined betting structures, electronic gaming device 100 may offer the player the opportunity to place a wager that out of the next 10 rolls, four of these rolls will result in hard numbers. A hard number occurs when both dice are the same number (e.g., first dice=3 and second dice=3). In another example, the gaming option may be that the first three rolls will not have an outcome that equals a seven, the next four rolls will not have an outcome of a hard number, and the last three rolls will not have an outcome that equals a craps. In the previous example, there were three outcome categories (e.g., outcome equaling a seven, outcome not equaling a hard number, and outcome not equaling a craps). Predetermined betting structures may utilize one outcome category (e.g., win, lose, hard number, craps, etc.) to generate via a processor gaming options. Predetermined betting structures may utilize more than one outcome category to generate via a processor gaming options.

Predetermined betting structures may combine any outcome category with any other outcome category to generate gaming options. For example, electronic gaming device 100 may offer a gaming option, which is structured so that the gaming option relates to more than one gaming table. The gaming option structure may be that for the next five baccarat games (e.g., baccarat games numbered 1010 to 1014) the banker will win three of these five games and three of the next five roulette games (e.g., roulette games numbered 900 to 904) red will be the winning spot. In another example, the gaming option structure may depend on the next three blackjack games at table 1, the next four baccarat games at table 2, the next game of roulette on table 3, the next two blackjack games at table 4, the fifth game of craps on table 5, the ninth game of Sic Bo on table 6, and the tenth blackjack game at table 1. In this example, any game on any table may be combined with any other game on any other table to form a gaming option.

Predetermined betting structures may also include outcomes from other events (e.g., sporting events, horse races, etc.). For example, a gaming option may be based on an outcome from a gaming table and an outcome from a horse race. The gaming option may be structured that if the next 6 out of 10 rolls on a craps table are winning rolls and a specific outcome occurs (e.g., Horse 3 wins Race A, Horse 3 shows in Race A, Horse 3 finishes last in Race A, etc.), then the wager has a payoff of X. In addition, any combination of table outcomes, racing outcomes, and/or sporting outcomes can be combined by predetermined betting structures to generate gaming options and payouts.

In an exemplary embodiment, the system generates a wager receipt (e.g., voucher). The system may allow for the voucher to be resold to a third party while the outcome of the wager is still uncertain. For example, a player makes an initial wager of $10 that on blackjack table numbered 1 the dealer will break 5 out of the next 10 games, which would generate a payout of $1,000. During the first four games the dealer breaks (e.g., goes over 21) four times, which increases the probability that the voucher will be worth $1,000. Since the dealer only needs to break one more time over the next 6 games at blackjack table numbered 1, the value of the voucher may have increased from the initial $10 to $900.

There are numerous ways that the player may obtain value for this voucher before the outcome is certain. For example, the gaming entity may allow the player to cash the voucher in at any time for the present value (e.g., net present value) of the voucher. In another example, a broker system may be established, which matches buyers and sellers of gaming option vouchers. In this approach, an option maker or a gaming entity constructs a bet parameters and prices that bet, resulting in a gaming option that can be offered for sale by a broker. The broker posts the gaming option and finds a buyer. The broker charges a transaction fee and facilitates the payments between the buyer and seller. The gaming entity may establish a market clearing function that allows players to buy and sell vouchers.

A derivative market may be established that allows for gaming options (e.g., puts and calls) to be bought and sold on an exchange. To facilitate the transactions, a pricing algorithm continually re-evaluates the risks associated with the positions of gaming options, and reprices their value as the bet parameters changed. Thus, like the equities in a stock market, gaming option vouchers are continuously repriced according to the game results of the specific gaming table.

For example, options may be sold on the $900 voucher detailed above. A call option with a $950 strike price may be valued at $940. A put option with a $950 strike price may be valued at $60. In various embodiments, options structures may include covered calls, naked calls, straddles, covered puts, naked puts, or any other options structure utilized in the stock market, currency market, commodity market, and/or any other market making entity.

The value of the voucher and options may vary depending on every game outcome until the final voucher value was fixed.

Contingent gaming options 108 may be gaming options which relate to outcomes for one or more gaming event and/or gambling event that have a triggering event. For example, a player may be offered a wagering option, which is structured that if the next 2 rolls are a 7 on a craps table (e.g., triggering event), then bet the next 5 outcomes will be a certain outcomes (e.g., win, lose, hard numbers, craps, and/or a specific number). In another example, contingent gaming options 108 may be that if the next 5 baccarat outcomes are banker wins (e.g., triggering event), then place a wager that 5 out of the next 10 games will result in player wins. Contingent gaming options 108 may be one or more predetermined gaming options 106 with a triggering event.

The triggering event for a contingent gaming option 108 may be preset by the gaming system, or chosen by the player. When preset by the gaming system, pricing may be determined in advance, and a menu of available contingent gaming options may be displayed at gaming device 100 for the players to select. When the triggering event is chosen by the player, a pricing algorithm uses the selected triggering event as one of the inputs to calculate the gaming option's price in real time.

A triggering event for a contingent gaming option 108 may be based on patterns of game outcomes. The game outcomes may be historical. For example, one pattern may be that the game outcomes of a baccarat table in the past 10 minutes (or in the past 20 games) which shows that the number of player-win/banker-win ratio exceeded the statistical average by a 15% margin. Contingent on the detection of the pattern (triggering event), players may place a bet that the ratio of banker-win/player-win will be greater than 1 over the next 10 minutes (or over the next 20 games). Similarly, in a roulette game, if the game outcomes in the past period show that there is a ratio imbalance between red and black, odd and even, etc., then the players may bet on a particular game outcome in the next game.

The triggering event for a contingent gaming option 108 may also be based on future patterns of game outcomes. If in a future series of game or time period, a game outcome pattern is detected (the triggering event for the contingent bet), a wager for a player may automatically be placed. For example, in a baccarat game, a player may "go long" (betting on positive game outcomes) on the banker's fourth hand if a pattern of three consecutive banker-wins occurred in a future series of n-games.

When a triggering pattern for the contingent bet has been set, a search may be launched for any future game outcome patterns at one or more game tables that match the preset triggering pattern. If a match is found, a wager may automatically be placed on behalf of the player according to the prescribed bet parameters. Bet parameters, or bet criterion, may include wager amount, aggregate wager amount for a game outcome, number of wagers placed, historical patterns, statistics over a time period, trends, extrapolation of trends, number of future games, future game outcomes, time period, and the like). In an alternative implementation, instead of automatically placing the wager, a player may choose to register with the gaming server to receive a reminder when a particular triggering pattern has been detected. A reminder, such as a text message, may then be sent to the players' mobile device when the triggering event for the contingent gaming option has been met. The player may decide whether to place a wager or not.

Bet parameters may also include a wagering budget, bet size, and wagering limits. These constraints may limit the potential losses for a player. For example, a wagering budget may be $100, with a bet size of $10 per bet. A wagering limit may be placed that if the wagering budget has dropped to 50% at any given time over the next 3 days, no more bets will be made. The wagering limit may also be triggered to not allow any more bets once the $100 has been reached.

In an exemplary embodiment, contingent gaming option 108 may be structures where the triggering event occurs over more than one gaming event, racing event, and/or sporting event. One structure may be that if the next two hands (e.g., numbered 1000 and 1001) of baccarat on table 1 are banker wins and the fifth game on blackjack table 2 is a dealer bust, then wager that the next three games (e.g., numbered 900, 901, and 902) of baccarat on table 3 will be player wins.

Another structure may be that if an outcome in a sporting event occurs (e.g., the Packer's win), then wager that a tie will occur within the next 10 games of baccarat on table 10.

Input devices 110 may be mechanical buttons, electronic buttons, a touchscreen, a microphone, cameras, optical scanner, or any combination thereof. Input devices 110 may be utilized to make a wager, to make an offer to buy or sell a voucher, to determine a voucher's worth, to cash in a voucher, to modify (e.g., change sound level, configuration, font, language, etc.) electronic gaming device 100, to select a movie or music, to select live video streams (e.g., table 1, table 2, table 3), to request services (e.g., drinks, manager, etc.), or any combination thereof.

Credit device 112 may be utilized to collect credits and distribute credits (e.g., cash, vouchers, etc.). Credit device 112 may interface with a mobile device to electronically transmit money and/or credits. Credit device 112 may interface with a player's card to exchange player points.

Players may also electronically add funds to gaming device 100. The funds may come from a pre-established betting account at the gaming venue or a bank account at a financial institution. When a player uses a pre-established account, all other transactions associated with the player can also be electronically recorded, resulting in cashless and paperless transactions. Electronic verification, recording, tracking, and reporting are also part of the account-based system much like that of a user's trading account at a stock exchange. For example, all the funds transfers (credit/debit) as well as buy/sell transactions of gaming options can be electronically recorded and tracked until the expiration date of the gaming options. No cash or physical vouchers are required, and the player can track his "portfolio" of gaming options at any time by pulling up his account information at gaming terminal 250 or a portable electronic device 245.

Identification device 114 may be utilized to determine an identity of a player. Identification device 114 may be a magnetic striped card, a smart card, a voucher, biometric sensors (e.g., fingerprint sensor, camera, microphone, and the like). Based on information obtained by identification device 114, electronic gaming device 100 may be reconfigured. For example, the language, background graphics, sound level, music, placement of video streams, placement of images from gaming tables, the placement of gaming options, and the tables utilized may be modified based on player preference data. For example, a player may only want to have gaming options for blackjack tables and baccarat tables. Therefore, no video streams would appear from craps tables, roulette tables, etc.

Figure 2:
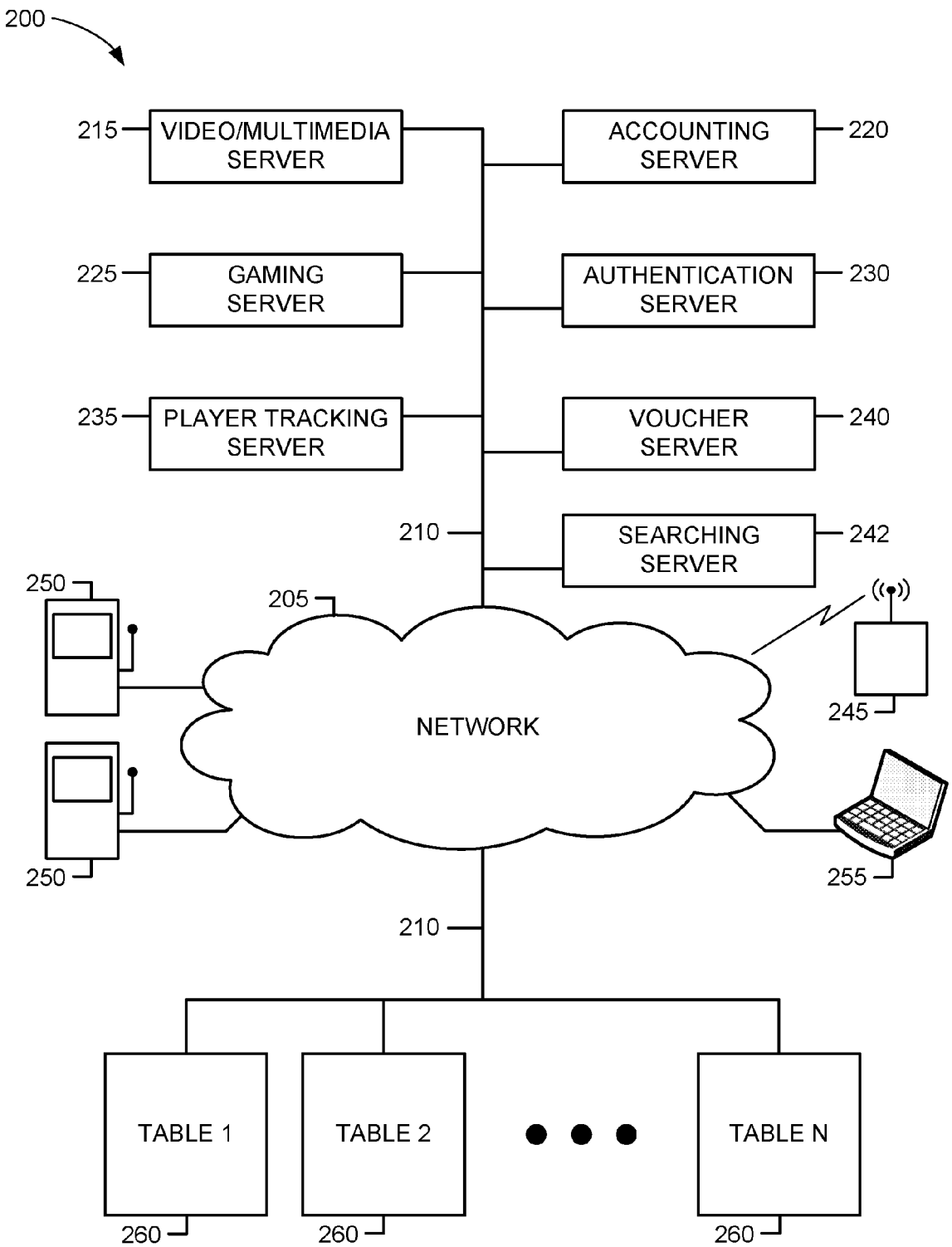
FIG. 2 is an illustration of an electronic gaming system, according to one embodiment.

In FIG. 2, an electronic gaming system 200 is shown. Electronic gaming system 200 may include electronic gaming tables 260, which may be coupled to network 205 via a network link 210. Electronic gaming tables 260 may be normal gaming tables with enhanced electronic capabilities. Network 205 may be the internet or a private network. One or more video streams may be received at video/multimedia server 215 from gaming tables 260. Video/Multimedia server 215 may transmit one or more of these video streams to a mobile device 245, a gaming device 250, a laptop 255, and/or any other remote electronic device. Video/Multimedia server 215 may transmit these video streams via network link 210 and network 205.

Electronic gaming system 200 may include an accounting/transaction server 220, a gaming server 225, an authentication server 230, a player tracking server 235, a voucher server 240, and a searching server 242.

Accounting/transaction server 220 may compile, track, store, and/or monitor cash flows, voucher transactions, winning vouchers, losing vouchers, and/or other transaction data for the casino operator and for the players. Transaction data may include the number of wagers, the size of these wagers, the date and time for these wagers, the identity of the players making these wagers, and the frequency of the wagers. Accounting/transaction server 220 may generate tax information relating to these wagers. Accounting/transaction server 220 may generate profit/loss reports for predetermined gaming options, contingent gaming options, predetermined betting structures, and/or outcome categories.

Gaming server 225 may generate gaming options based on predetermined betting structures and/or outcome categories. These gaming options may be predetermined gaming options, contingent gaming options, and/or any other gaming option disclosed in this disclosure.

Authentication server 230 may determine the validity of vouchers, players' identity, and/or an outcome for a gaming event.

Player tracking server 235 may track a player's betting activity, a player's preferences (e.g., language, drinks, font, sound level, etc.). Based on data obtained by player tracking server 235, a player may be eligible for gaming rewards (e.g. free play), promotions, and/or other awards (e.g., complimentary food, drinks, lodging, concerts, etc.).

Voucher server 240 may generate a voucher, which may include data relating to gaming options. For example, data relating to the structure (e.g., 6 out of the next 10 rolls at craps table 4 will be a 7 or 11) may be generated. If there is a time deadline, that information may be generated by voucher server 240. Vouchers may be physical (e.g., paper) or digital.

Searching server 242 may implement a search on one or more gaming devices to obtain gaming data. Searching server 242 may implement a messaging function, which may transmit a message to a third party (e.g., a player) relating to a search, a search status update, a game status update, a wager status update, a confirmation of a wager, a confirmation of a money transfer, and/or any other data relating to the player's account. The message can take the form of a text display on the gaming device, a pop up window, a text message, an email, a voice message, a video message and the like. Searching server 242 may implement a wagering function, which may be an automatic wagering mechanism. These functions of searching server 242 may be integrated into one or more servers.

Searching server 242 may include one or more searching structures, one or more searching algorithms, and/or any other searching mechanisms. In general, the search structures may cover which table games paid out the most money during a time period, which table games kept the most money from players during a time period, which table games are most popular (top games), which table games are least popular, which table games have the most amount of money bet during a period, which table games have the highest bet volume, which table games are more volatile (volatility, or deviation from the statistical norms, of bet volume, bet amount, pay out, etc.) during a time period, and the like. Search may also be associated with location queries, time queries, and/or people queries (e.g., where are the table games that most of my friends bet on, where are my favorite dealers, what do players bet on the most today, when are most bets placed, etc.).

The searching structures may be predetermined searching structures. For example, the method may start searching a first device, then a second device, then a third device, up to an $N^{th}$ device based on one or more searching parameters (e.g., triggering event). In one example, the search may end once one or more triggering events are determined. In another example, the search may end once data has been received from a predetermined number (e.g., one, two, ten, one hundred, all) of the devices. In another example, the search may be based on a predetermined number of devices to be searched in combination with a predetermined number of search results to be obtained. In this example, the search structure may be a minimum of ten devices to be searched, along with a minimum of five gaming options to be determined.

In another example, the searching structures may be based on one or more specific games (e.g., baccarat tables, roulette tables, blackjack tables, poker tables, craps tables, Sic Bo tables, etc.). Searching structure may search one or more of these games.

In another example, the searching structure may be based on a player's preferences, past transactional history, player input, a particular table, a particular game, a particular dealer, a particular casino, a particular location within a casino, game outcomes over a time period, payout over a time period, and/or any other criteria.

Searching algorithms may be dynamic searching programs, which may be modified based on one or more past results. For example, a search algorithm may be based on searching blackjack tables. The search algorithm may initially search blackjack tables 1-10 to determine whether any triggering events have occurred. Based on one or more previous searches, the search algorithm may determine: (1) that blackjack tables 1-4 are only opened from 7 pm to 3 am; (2) that blackjack tables 5-7 are opened twenty-four hours a day; and (3) that blackjack tables 8-10 are only opened from 7 am to 5 pm. The search algorithm may then modify the search parameters utilized based on this data. For example, if the search algorithm is initiated at 6 pm to determine blackjack triggering events, then the search algorithm may only search blackjack tables 5-7 because these blackjack tables are the only blackjack tables operating at that specific time.

Figure 3:
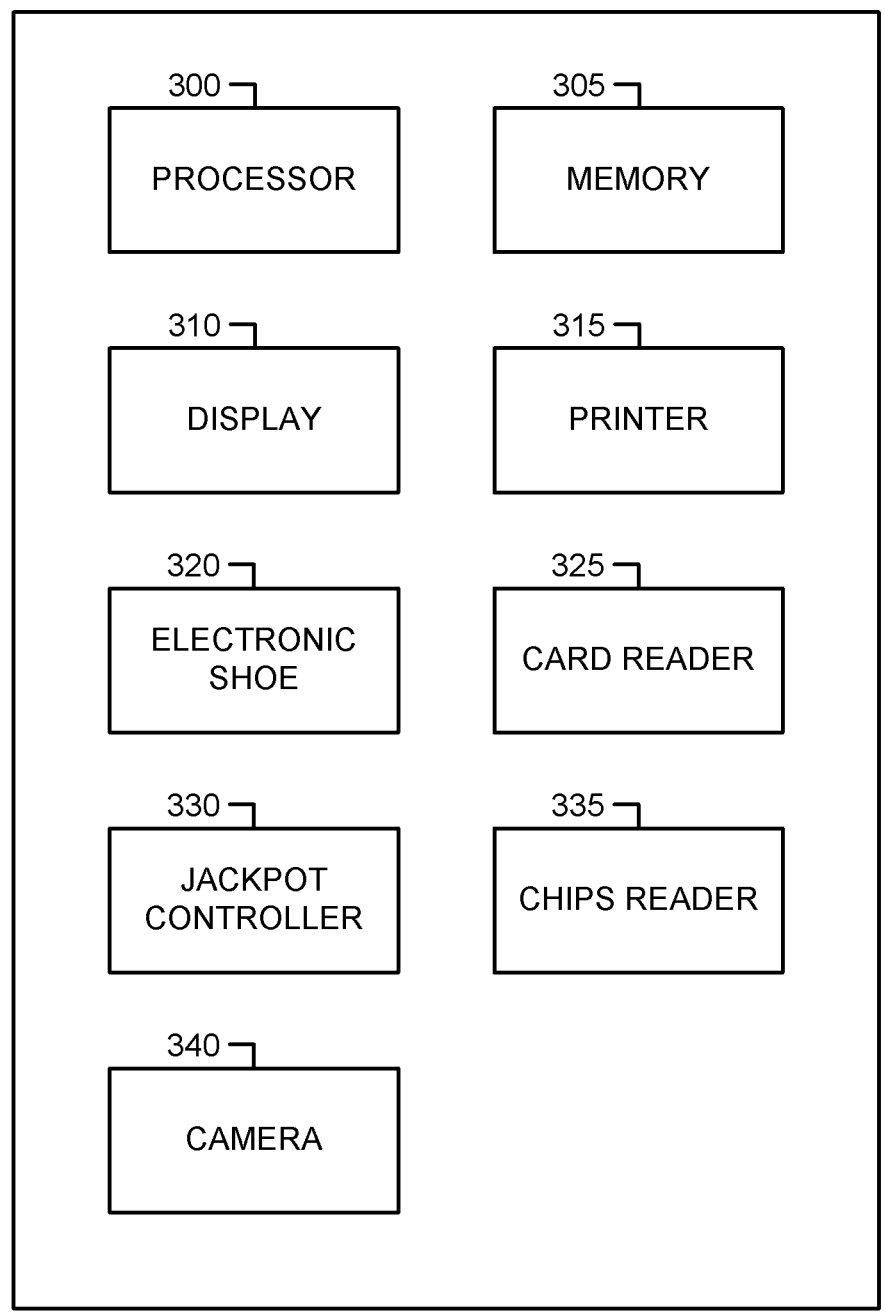
FIG. 3 is an illustration of an electronic gaming table, according to one embodiment.

In another example, the search algorithm may determine that a specific triggering event occurs with a ninety percent success rate on a first table, a ten percent success rate on a second table, a fifty percent success rate on a third table, and a seventy percent success rate on a fourth table. The search algorithm may generate a search priority based on the probability of success, which may lead to the first table being searched second, the fourth table being searched first, the third table being searched third, and the second table being searched fourth. Search algorithm may utilize any dynamic feedback procedure to enhance current and/or future searching results FIG. 3 shows electronic gaming table 260 with various features. Electronic gaming table 260 may include a processor 300, a memory 305, a display 310, a printer 315, an electronic shoe 320, a smart card reader 325, a jackpot controller 330, a chips reader 335, and a camera 340.

Processor 300 may be communicatively coupled to any other device in electronic gaming table 260. Processor 300 via an interface may communicate, wired or wireless, with any of the elements of electronic gaming device 100 and/or electronic gaming system 200.

Memory 305 may include data relating to gaming events, video streams transmitted from electronic gaming table 260, winning and losing percentages for gaming options relating to electronic gaming table 260, and game management data (e.g., dealer schedule, chip refills, etc.).

Display 310 may show previous game results, a betting structure, outstanding bets, transaction volume, present value of betting options, a table minimum bet, a table maximum bet, or any other video data.

Printer 315 may generate vouchers, promotional items, food tickets, event tickets, and/or lodging tickets. Vouchers may be physical (e.g., paper) or digital.

Electronic shoe 320 may obtain data and/or images of gaming objects utilized with gaming table 260. This data and/or images may be transmitted to electronic gaming device 100 and displayed as images from table games 104. For example, on a blackjack table a ten of spades may be dealt to a player. This information is obtained via electronic shoe 320 and utilized to generate an image and/or illustration of a ten of spades card on electronic gaming device 100, which is shown in FIG. 1 as images from table games 104. In another example, electronic shoe 320 may receive data relating to the numbers on dice, transmit this data to electronic gaming device 100, which may be utilized to generate an image/illustration of the dice on electronic gaming device 100 (e.g., images from table games 104).

Card reader 325 may provide identification, authentication, and application processing functions. Card reader 325 may interface with smart cards, magnetic striped card, bar code reader, RFID card, and the like.

Jackpot controller 330 may track and compile data associated with a jackpot. Jackpot controller 330 may award the jackpot on a specific occurrence (e.g., dealing a royal flush) and/or randomly award a jackpot.

Chips reader 335 may compile and track data associated with the amount of chips one or more players possesses, the amount of chips won/lost at gaming table 260, the amount of chips in the dealer's rack at gaming table 260, an amount of chips bet by one or more players, amount of chips in the betting pool, and/or any combination thereof.

Camera 340 may obtain data from gaming table 260. Camera 340 may be one or more cameras located to view the gaming objects (e.g., cards, dice, dominos, ball, wheel, etc.), the dealer, the shoe, the players' hands, the players, and/or any combination thereof. Camera 340 may transmit this data to gaming table 100, which may be utilized to generate an image/illustration of the gaming objects.

Figure 4:
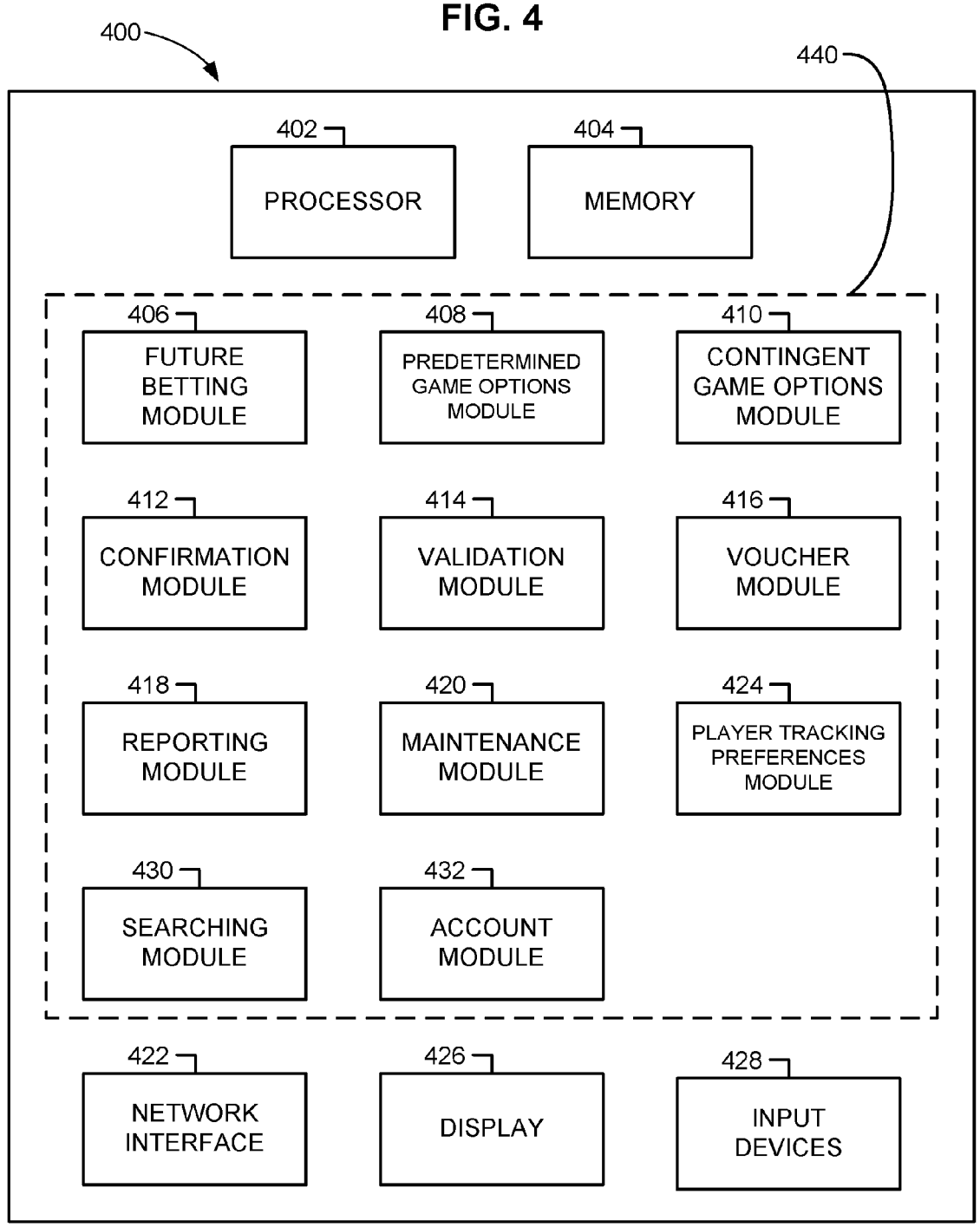
FIG. 4 is a block diagram of the electronic gaming device, according to one embodiment.

FIG. 4 shows a block diagram 400 of electronic gaming device 100. Electronic gaming device 100 may include a processor 402, a memory 404, a network interface 422, input devices 428, and a display 426.

Processor 402 may generate gaming options based on predetermined betting structures and/or outcome categories. As previously discussed in the craps example above, predetermined betting structures may include outcome categories. In that example, there were three outcome categories (e.g., outcome equaling a seven, outcome not equaling a hard number, and outcome not equaling a craps). Predetermined betting structures may utilize one outcome category (e.g., win, lose, hard number, craps, etc.) to generate via processor 402 gaming options. Predetermined betting structures may utilize more than one outcome category to generate via processor 402 gaming options. Predetermined betting structures may combine any outcome category with any other outcome category to gaming options.

Processor 402 may offer a gaming option which is structured so that the gaming option relates to more than one gaming table. The gaming option structure may be that for the next five baccarat games (e.g., games numbered 1010 to 1014) the dealer will win three of these five games and three of the next five roulette games (e.g., games numbered 900 to 904) red will be the winning spot.

Processor 402 may generate contingent gaming options 108 and/or predetermined gaming options 106. Contingent gaming options 108 may be structures such that when a triggering event occurs over one or more than one gaming event, racing event, and/or sporting event, the wager is activated.

Network interface 422 may allow electronic gaming device 100 to communicate with video/multimedia server 215, accounting/transaction server 220, gaming server 225, authentication server 230, player tracking server 235, voucher server 240, and gaming table 260.

Input devices 428 may be mechanical buttons, electronic buttons, a touchscreen, a microphone, cameras, an optical scanner, or any combination thereof. Input devices 428 may be utilized to make a wager, to make an offer to buy or sell a voucher, to determine a voucher's worth, to cash in a voucher, to modify (e.g., change sound level, configuration, font, language, etc.) electronic gaming device 100, to select a movie or music, to select live video streams (e.g., table 1, table 2, table 3), to request services (e.g., drinks, manager, etc.), or any combination thereof.

Display 426 may show video streams from one or more gaming tables 260, gaming objects from one or more gaming tables 260, computer generated graphics, predetermined gaming options 106, and/or contingent gaming options 108.

Memory 404 may include various memory modules 440. Memory 404 via various memory modules 440 may include a future betting module 406, a predetermined game options module 408, a contingent game options module 410, a confirmation module 412, a validation module 414, a voucher module 416, a reporting module 418, a maintenance module 420, a player tracking preferences module 424, a searching module 430, and an account module 432.

Future betting module 406 may store data relating to the predetermined betting structure. Processor 402 may utilize data in future betting module 406 to generate predetermined gaming options 106 and contingent gaming options 108. Any other processor (e.g., gaming server 225, any virtualized gaming server, etc.) may implement these functions of processor 402.

Predetermined game options module 408 may store data relating to predetermined gaming options 106, which may be offered to a player.

Contingent game options module 410 may store data relating to continent gaming options 108, which may be offered to a player.

Confirmation module 412 may utilize data received from a voucher, the transaction history of the voucher (e.g., the voucher changed hands in a secondary market), and/or the identity of the player to confirm the value of the voucher. In another example, confirmation module 412 may utilize game event data, along with voucher data to confirm the value of the voucher.

Validation module 414 may utilize data received from a voucher to confirm the validity of the voucher.

Voucher module 416 may store data relating to generated vouchers, redeemed vouchers, bought vouchers, and/or sold vouchers.

Reporting module 418 may generate reports related to a performance of electronic gaming device 100, electronic gaming system 200, table game 260, video streams, gaming objects, credit device 112, and/or identification device 114.

In one implementation, reporting module 418 may reside on a central server and can aggregate and generate real time statistics on betting activities at one or more table games at one or more participating casino's. The aggregate betting statistics may include trends (e.g., aggregate daily bet volume and bet amount by game types, by casinos, and the like), top games with the most payouts, top tables with the most payouts, top search structures used by players, most popular dealers by bet volume, most searched for game, tables with least payouts, weekly trends, monthly trends, and other statistics related to game plays, bets, people, location, and searches.

The information and statistics generated by the server-based reporting module 418 can be displayed publicly or privately. For example, popular trending and statistical information on bet volume and bet amount for the top ten table games can be publicly displayed in a casino display system so that players can study and decide what game to play, where, when, etc. Such a public display of general statistics can also be posted on the Internet, sent out as a text, an email, or multimedia message to the player's smart phones, tablets, desktop computer, etc. In another example, the trending and statistical information can also be distributed privately to privileged players such as casino club members.

Maintenance module 420 may track any maintenance that is implemented on electronic gaming device 100 and/or electronic gaming system 200. Maintenance module 420 may schedule preventative maintenance and/or request a service call based on a device error.

Player tracking preferences module 424 may compile and track data associated with a players preferences.

Searching module 430 may include one or more searching structures, one or more searching algorithms, and/or any other searching mechanisms. The searching structures may be predetermined searching structures. For example, the method may start searching a first device, then a second device, then a third device, up to an $N^{th}$ device based on one or more searching parameters (e.g., triggering event). In one example, the search may end once one or more triggering events are determined. In another example, the search may end once data has been received from a predetermined number (e.g., one, two, ten, one hundred, all) of the devices. In another example, the search may be based on a predetermined number of devices to be searched in combination with a predetermined number of search results to be obtained. In this example, the search structure may be a minimum of ten devices to be searched, along with a minimum of five gaming options to be determined.

In another example, the searching structures may be based on one or more specific games (e.g., baccarat tables, roulette tables, blackjack tables, poker tables, craps tables, Sic Bo tables, etc.). Searching structure may search one or more of these games.

In another example, the searching structure may be based on a player's preferences, past transactional history, player input, a particular table, a particular game, a particular dealer, a particular casino, a particular location within a casino, game outcomes over a time period, payout over a time period, and/or any other criteria.

Searching algorithms may be dynamic searching programs, which may be modified based on one or more past results. For example, a search algorithm may be based on searching blackjack tables. The search algorithm may initially search blackjack tables 1-10 to determine whether any triggering events have occurred. Based on one or more previous searches, the search algorithm may determine: (1) that blackjack tables 1-4 are only opened from 7 pm to 3 am; (2) that blackjack tables 5-7 are opened twenty-four hours a day; and (3) that blackjack tables 8-10 are only opened from 7 am to 5 pm. The search algorithm may then modify the search parameters utilized based on this data. For example, if the search algorithm is initiated at 6 pm to determine blackjack triggering events, then the search algorithm may only search blackjack tables 5-7 because these blackjack tables are the only blackjack tables operating at that specific time.

In another example, the search algorithm may determine that a specific triggering event occurs with a ninety percent success rate on a first table, a ten percent success rate on a second table, a fifty percent success rate on a third table, and a seventy percent success rate on a fourth table. The search algorithm may generate a search priority based on the probability of success, which may lead to the first table being searched first, the fourth table being searched second, the third table being searched third, and the second table being searched fourth. Search algorithm may utilize any dynamic feedback procedure to enhance current and/or future searching results.

Account module 432 may include data relating to an account balance, a wager limit, a number of wagers placed, credit limits, any other player information, and/or any other account information.

Data from account module 432 may be utilized to determine whether a wager may be accepted. For example, when a search has determined a triggering event, the device and/or system may determine whether to allow this wager based on one or more of a wager amount, a number of wagers, a wager limit, an account balance, and/or any other criteria.

For example, the system and/or device determines via searching function that a triggering event has occurred. Based on this triggering event, the player would like to make a $100 wager, however, the player's account balance is only $50. In this case, the system and/or device may not accept the wager, modify the wager to the account balance (e.g., $50), send a notice to the player, modify the wager to some percentage (e.g., 10%, 25%, 50%, 75%, etc.) of the account balance (e.g., $5, $12.50, $25, $37.5, etc.), send a notice to the gaming entity, make a flat wager (e.g., $10), and/or any combination thereof.

In another example, the system and/or device determines via searching function that a triggering event has occurred. Based on this triggering event, the player would like to make a $100 wager and the player's account balance is $150.

However, the system and/or device may not accept the wager because one betting parameter may be that no one wager may be more than a certain percentage (e.g., fifty percent) of a player's account balance. In this case, the system and/or device may not accept the wager, modify the wager to the predetermined limit (e.g., $75), send a notice to the player, modify the wager to some other percentage (e.g., 5%, 10%, 25%, 40%, etc.) of the account balance, send a notice to the gaming entity, make a flat wager (e.g., $10), and/or any combination thereof.

In another example, the gaming jurisdiction, the casino, the system and/or device may not allow an individual to place a wager over a specific value (e.g., $25, $100, $1,000, $10,000, $100,000, $1,000,000, etc.).

In another example, the system and/or device may not allow an individual to lose more than a specific amount of money in a predetermined timeframe. An individual may only be allowed to lose $200 (or any other number) over a two hour period (or any other time period).

In another example, based on this triggering event, the player would like to make a $100 wager and the player has a $200 balance. However, the player has made a predetermined number of wagers within a predetermined time frame. For example, the system and/or device may not allow an individual to make more than 5 wagers a day, 25 wagers a week, 1,000 wagers a year, etc.

Any of these betting parameters may be combined by the system and/or device.

Although the modules discussed in block diagram 400 reside in gaming device 100, the functions performed by these modules may be implemented in one or more remote servers in an alternative approach. For instance, modules 406-420 and 424 may each be on a remote server, communicating with gaming device 100 via a network interface such as Ethernet in a local or a wide area network topology. In some implementations, these servers may be physical servers in a data center. In some other implementations, these servers may be virtualized. In yet some other implementations, the functions performed by these modules may be implemented as web services. For example, the predetermined game options module 408 may be implemented in software as a web service provider. Gaming device 100 would make service requests over the web for the available predetermined bet options to be displayed. Regardless of how the modules and their respective functions are implemented, the interoperability with the gaming device 100 is seamless.

In one exemplify implementation, reporting module 418 may reside on a central server and can aggregate and generate real time statistics on betting activities at one or more table games at one or more participating casino's. The aggregate betting statistics may include trends (e.g., aggregate daily bet volume and bet amount by game types, by casinos, and the like), top games with the most payouts, top tables with the most payouts, top search structures used by players, most popular dealers by bet volume, most searched for game, tables with least payouts, weekly trends, monthly trends, and other statistics related to game plays, bets, people, location, and searches.

The information and statistics generated by the server-based reporting module 418 can be displayed publicly or privately. For example, popular trending and statistical information on bet volume and bet amount for the top ten table games can be publicly displayed in a casino display system so that players can study and decide what game to play, where, when, etc. Such a public display of general statistics can also be posted on the Internet, sent out as a text, an email, or multimedia message to the player's smart phones, tablets, desktop computer, etc. In another example, the trending and statistical information can also be distributed privately to privileged players such as casino club members.

Figure 5:
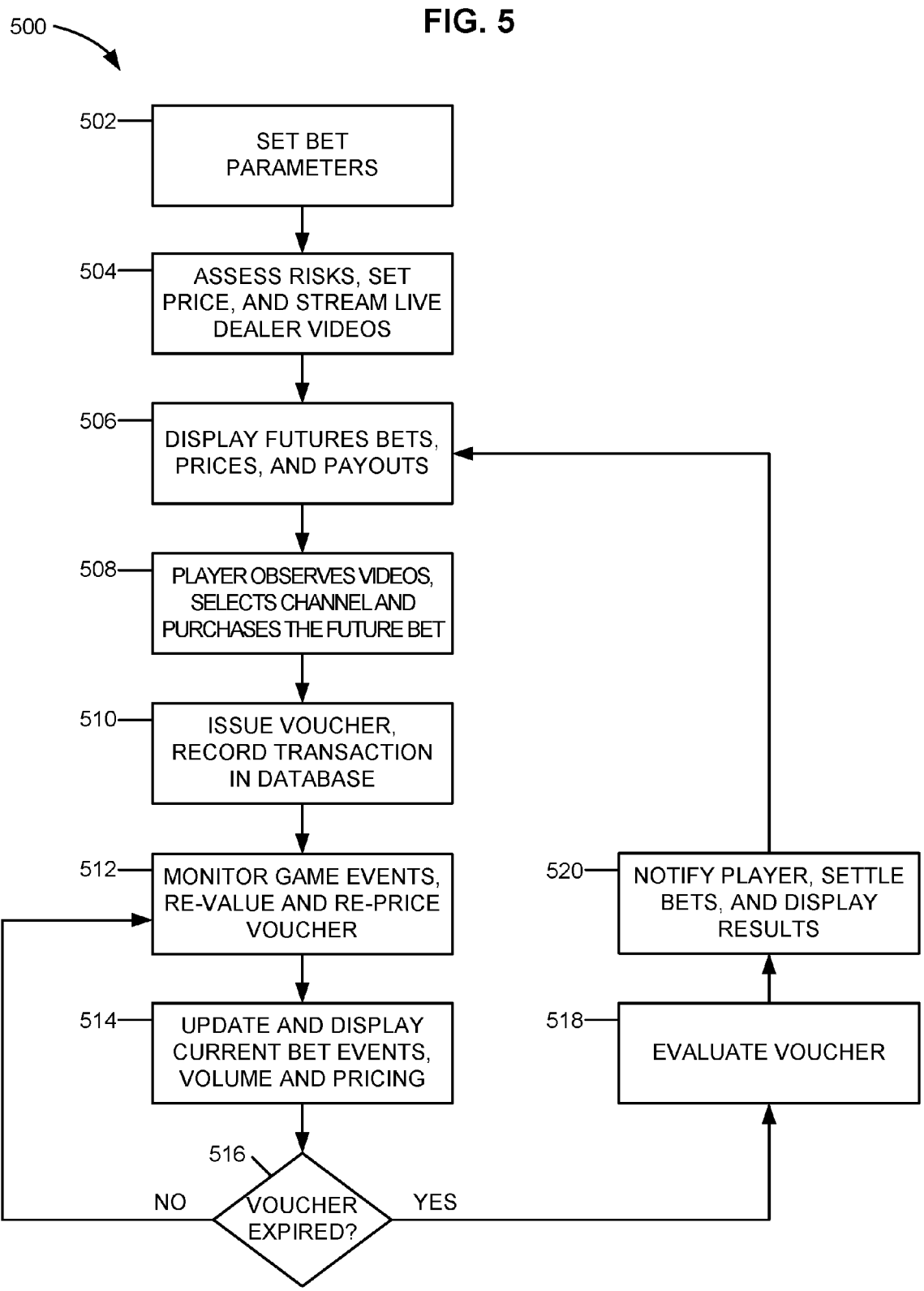
FIG. 5 is a flow diagram for a method of operating the electronic gaming device and/or the electronic gaming system, according to one embodiment.

In FIG. 5, a flow diagram of a method for operating the device and/or system 500 is shown. The method may include setting betting parameters (step 502). The method may include assessing the risk, setting a price, and streaming live videos (step 504). The streaming videos may be of a dealer, one or more gaming tables, one or more gaming objects, and/or any other videos. The method may include displaying future bets, pricing for these future bets, and/or payouts for these future bets (step 506). The method may include obtaining data from a player (step 508).

For example, a player may select a channel that may determine which video feeds are displayed on the gaming device and/or system, may review historical data, statistics, trending information and the like. In another example, the player may purchase a gaming option by placing a future bet. The player may provide a player's preference data, which may reconfigure the gaming device and/or system. For example, the font size of a display may be modified, the placement of various video streams may be changed, the placement of images from table games 104 may be modified, and the sound level may be changed based on a player's preference data. In various examples, based on this player's preference data, only blackjack tables may be displayed on the screen, only baccarat tables numbered 4 and 6 may be displayed, only roulette tables may be displayed once numbers corresponding to a red win happens three times in a row, blackjack tables and baccarat tables may be displayed after the dealer/banker has lost five times in a row, and/or any combination thereof.

The method may further include issuing a voucher and recording the transaction in a database (step 510). The method may include monitoring game events and re-pricing the voucher based on these game events (step 512). The method may include updating and displaying current betting events which may include volume data and pricing data (step 514). The method may include determining whether a voucher has expired (step 516). If the voucher has not expired, then the method may move back to step 512. If the voucher has expired, then the method may evaluate the voucher (step 518). The method may notify the player, settle the bet, and display the results (step 520).

Figure 6:
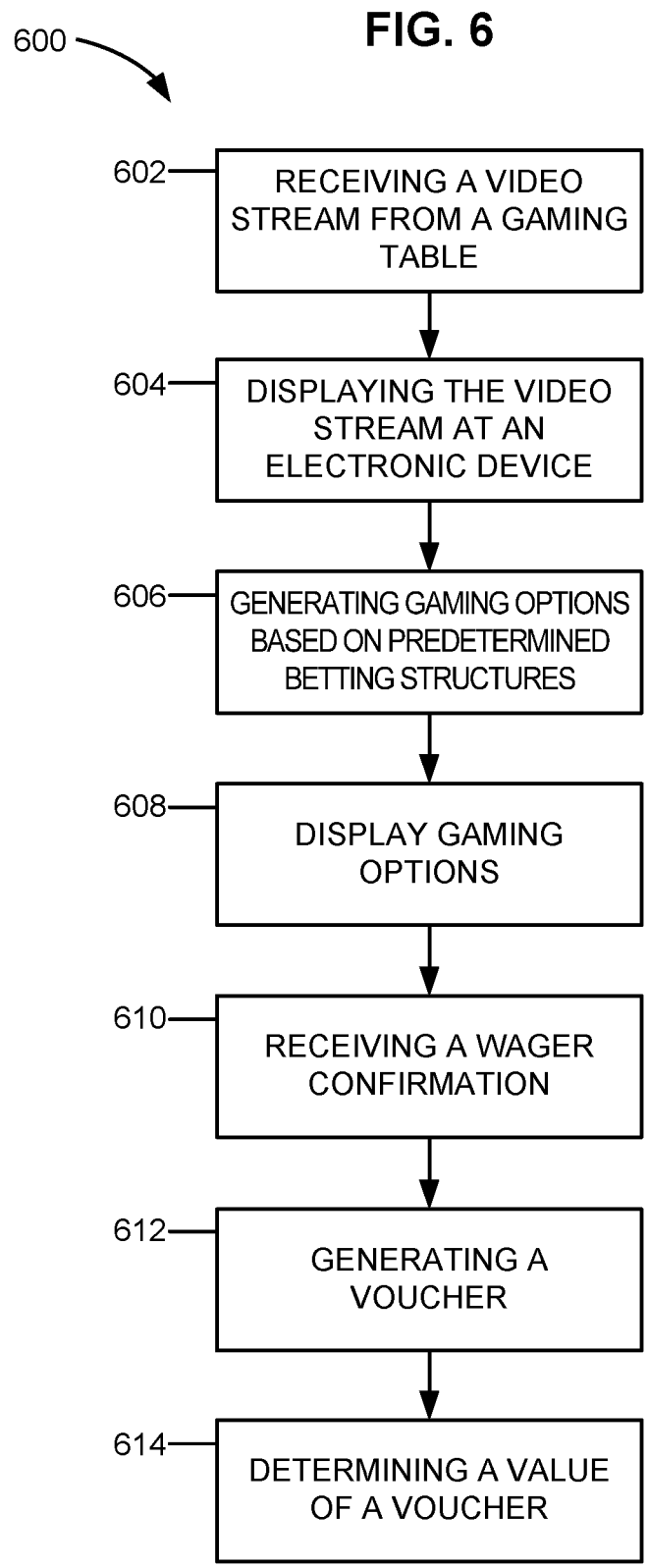
FIG. 6 is a flow diagram for utilizing predetermined betting structures to provide gaming options to a player, according to one embodiment.

In FIG. 6, a flow diagram for utilizing predetermined betting structures to provide gaming options 600 to a player is shown. The method may include receiving a video stream from a gaming table (step 602). The method may include displaying the video stream at an electronic gaming device (step 604). The method may include generating gaming options based on predetermined betting structures (step 606). The method may include displaying the gaming options (step 608). The method may include receiving a wager confirmation (step 610). The method may include generating a voucher (step 612). The method may include determining the present or current value of a voucher (step 614).

Figure 7:
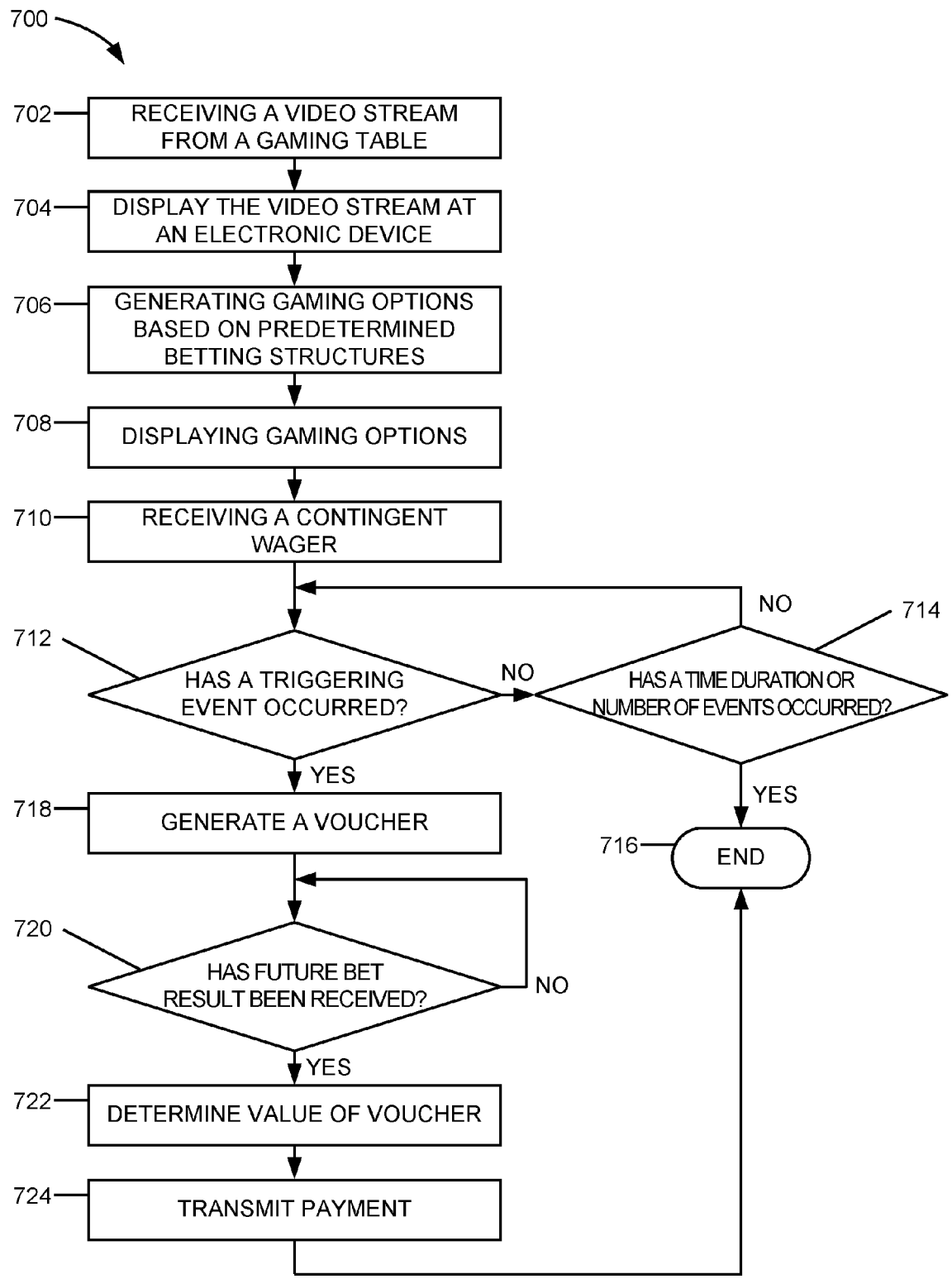
FIG. 7 is a flow diagram for utilizing predetermined betting structures to proving gaming options to a player that have a triggering event, according to one embodiment.

In FIG. 7, a flow diagram for utilizing predetermined betting structures to proving gaming options to a player that have a triggering event 700 is shown. The method may include receiving a video stream from a gaming table (step 702). The method may further include displaying the video stream at electronic gaming device 100 (step 704). The method may include generating gaming options based on predetermined betting structures (step 706). The method may include displaying the gaming options (step 708). The method may include receiving a contingent wager (step 710). The method may determine whether a triggering event has occurred (step 712). If the triggering event has not occurred, then the method may move to step 714. The method may determine whether a time duration has occurred or a number of events has occurred (step 714). If a time duration or a number of events has not occurred, then the method may move to step 712. If a time duration or a number of events has occurred, then the method ends (step 716). If the triggering event has occurred, then the system may generate a voucher (step 718). The method may include determining whether a voucher data has been received (step 720). If the voucher data has not been received, then the method may move to step 720. If the voucher data has been received, then the method may determine a value for the voucher (step 722). The method may transmit payment (724).

Figure 8:
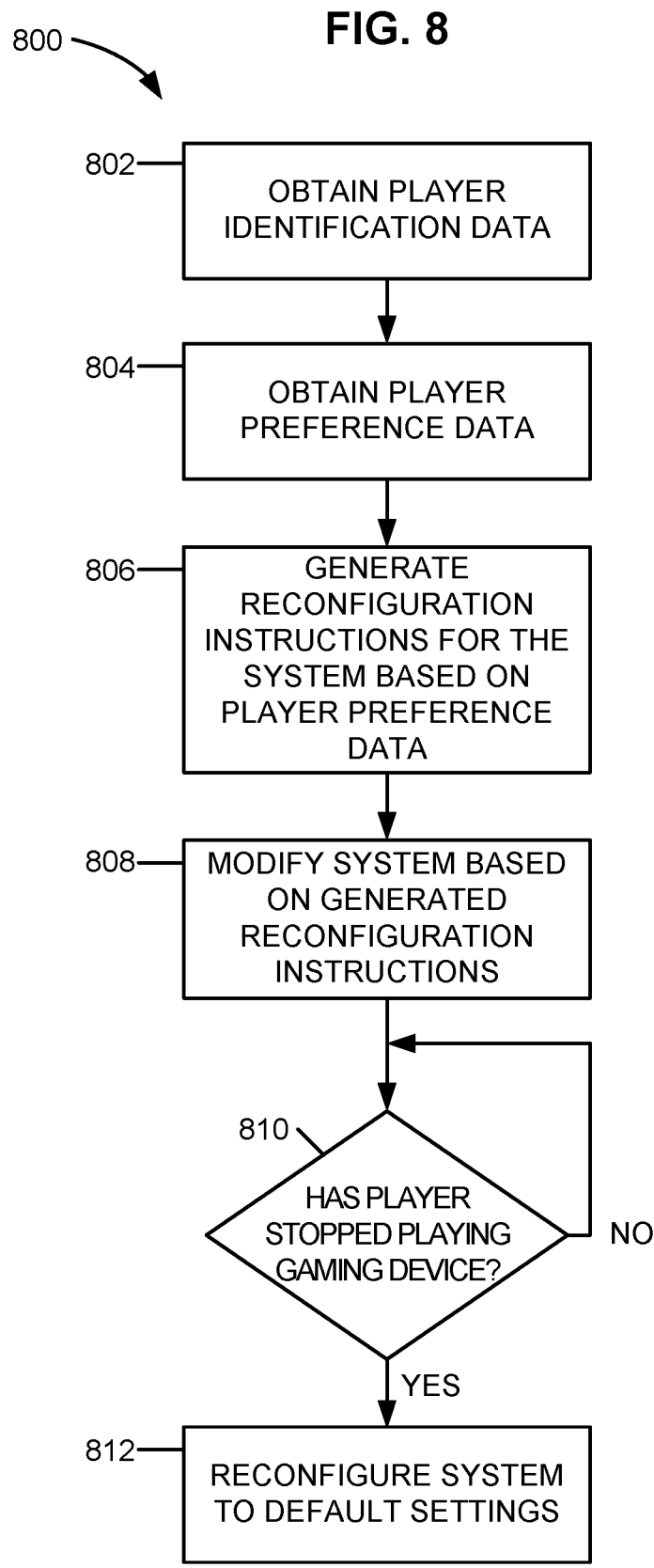
FIG. 8 is a flow diagram of an example process for reconfiguring at least a portion of the electronic gaming device.

In FIG. 8, a flow diagram of an example process for reconfiguring at least a portion of the electronic gaming device 800 is shown. The method may include obtaining player identification data (step 802). The method may obtain player preference data based on the obtained player identification data (step 804). The method may generate reconfiguration instructions for the system and/or the device based on the player preference data (step 806). The method may modify the device and/or the system based on the generated reconfiguration instructions (step 808). The method may determine whether the player has stopped playing electronic gaming device 100 and/or electronic gaming system 200 (step 810). If the player is still playing electronic gaming device 100 and/or electronic gaming system 200, the method may move to step 810. If the player has stopped playing electronic gaming device 100 and/or electronic gaming system 200, the method may reconfigure electronic gaming device 100 and/or electronic gaming system 200 to their default settings (step 812).

Figure 9:
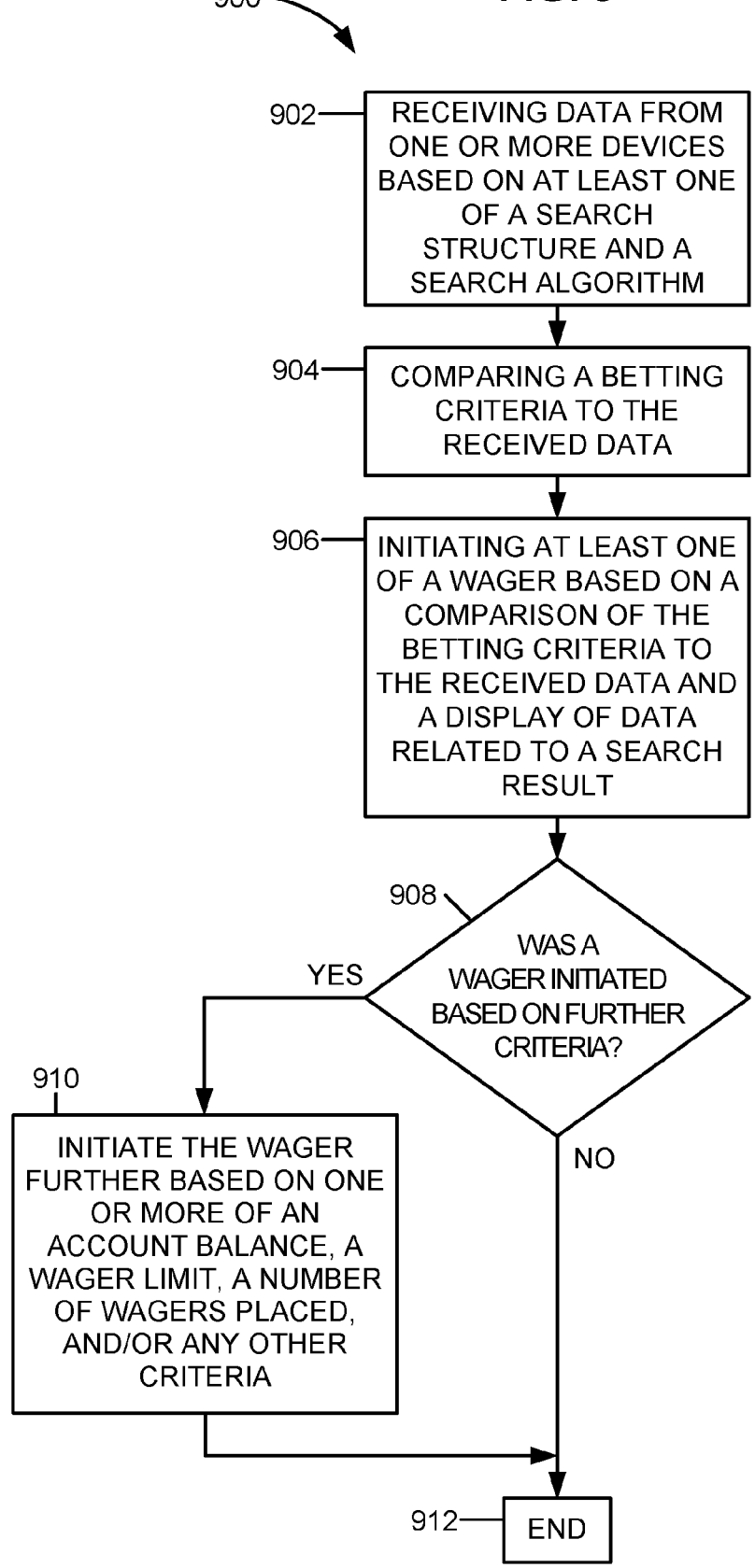
FIG. 9 is a flow diagram of an example process for obtaining search data for one or more gaming devices, according to one embodiment.

In FIG. 9, a flow diagram of a process for obtaining search data for one or more gaming devices 900 is shown. The method may include receiving data from one or more devices (e.g., gaming devices, gaming tables, etc.) based on at least one of a search structure and a search algorithm (step 902). The method may further include comparing betting criteria (and/or a betting criterion) to the received data (step 904). The method may include the system and/or device initiating at least one of a wager based on a comparison of the betting criteria (and/or a betting criterion) and a display of data related to a search result (step 906). The method may include the system and/or device determined whether the wager was initiated based on additional criteria (step 908). If the wager was not initiated based on additional criteria, then the method ends (step 912). If the wager was initiated based on additional criteria, then the method may initiate the wager which may be further based on one or more of an account balance, a wager limit, a wager amount, a number of wagers placed, and/or any other criteria (step 910). After step 910, the method may end (step 912).

Processor may include communication interfaces for communicating with electronic gaming device 100, electronic gaming system 200, and user interfaces to enable communication with all gaming elements. Electronic gaming device 100 may include a peripheral device interface (e.g., a USB port, a wireless interface such as Bluetooth or Wi-Fi for connecting to a portable electronic device, etc.) that a user may employ to receive information from electronic gaming device (e.g., monitor a future bet progress, watch a movie, listen to music, obtain verbal betting options, etc.). Electronic gaming device 100 may include a printer for printing vouchers, informational materials, advertisements, and/or coupons.

Display may be used to present menus and controls, as well as to present any gaming information. A text display may show text in one or more languages. The system may be converted to utilize any language by default, gaming entity programming, and/or player selection. In some implementations, a community display may also be utilized. The community display may show historical bet information, statistics, trending information, present value of various bet options, transaction volume, future bets available, and the like.

Electronic gaming device 100 may communicate with a mobile device. Electronic gaming device 100 may include a wireless user interface such as Bluetooth, Wi-Fi, Near-Field Communication, etc., which may be utilized with a mobile device. The user interface may be a microphone, a camera, a keypad, a touch screen, an electrical connection, an optical input, or any other suitable means for coupling user interface to a mobile device.

In an exemplary embodiment, electronic gaming device 100 may include a memory. The memory may include a future betting module. The future betting module may include one or more predetermined betting structures relating to future game results. Electronic gaming device 100 may include a processor, which may generate gaming options based on the one or more predetermined betting structures relating to future game results. Electronic gaming device 100 may include a network interface, which may receive video streams from one or more gaming tables. Electronic gaming device 100 may include a display which may display one or more video stream from the one or more gaming tables. Electronic gaming device 100 may include an input device, which may receive wagering data.

The gaming tables may include a baccarat table, a roulette table, a blackjack table, a poker table, a craps table, and a Sic Bo table. The video streams may include a live video stream of a dealer managing a game at one of the gaming tables. The dealer management may be dealing cards, spinning a wheel, casting a dice, placing dominos, and/or any other activity relating to the game.

In another example, the video streams may include a live video stream of one or more gaming objects from one or more gaming tables. The gaming object may be a roulette ball, a card, a card shoe, dice, a betting chip, a token, a domino, and/or a wheel. In an exemplary embodiment, a generated gaming option may be based on an occurrence of a number of outcomes at a gaming table occurring over a number of game plays. The number of outcomes and number of games may be a predetermined number.

The processor may generate a voucher based on a wager confirmation, which may be received by an input device, a server, a mobile device, and/or any combination thereof. A voucher device may generate, print, transmit, or receive a voucher. The voucher may represent a betting option, a betting structure, a betting timeline, a value of bet, a payout potential, or any other betting data.

The memory may include a confirmation module, which may authenticate a value of a voucher and/or the validity of the voucher. The processor may determine a value of the voucher based on generated voucher data and data in the confirmation module. Electronic gaming device 100 may include a player preference input device. The player preference input device may modify a game configuration. The modification may be based on data from the identification device.

In an exemplary embodiment, a method of providing gaming options may include receiving one or more video streams from one or more gaming tables. The method may further include displaying the one or more video streams from one or more gaming tables on electronic gaming device 100. In addition, the method may generate gaming options based on data relating to one or more gaming tables. The gaming options may be based on predetermined betting structures relating to future game play results. Further, the method may display the gaming options.

The method may generate a voucher based on a received wager confirmation data. The method may obtain voucher data and determine a value of the voucher based on the voucher data and game play data.

In an exemplary embodiment, an electronic gaming system may include a server. The server may include a server memory and a server processor. The server may receive one or more video streams from one or more gaming tables. The server may transmit one or more video streams to one or more electronic gaming device 100. The server memory may include a future betting module. The future betting module may include one or more predetermined betting structures and/or outcome categories relating to future game results. The server processor may generate gaming options based on one or more predetermined betting structures and/or outcome categories relating to future game results.

The server processor may generate a voucher based on a wager confirmation being received from the input device. The server memory may include a confirmation module. The server processor may determine a value of the voucher based on a generated voucher data and data in the confirmation module.

In an exemplary embodiment, a method may include receiving one or more video streams from one or more gaming tables. The method may include displaying the one or more video streams from one or more gaming tables on electronic gaming device 100. The method may include generating gaming options based on data relating to one or more gaming tables. The gaming options may be based on predetermined betting structures and/or outcome categories relating to future game play results. In addition, the method may include displaying the gaming options and receiving a contingent wager.

The contingent wager may be based on a triggering event which confirms a wager based on an occurrence of a predetermined number of game outcomes at a gaming table occurring over a predetermined number of game plays. The triggering event can be any event.

In one example, the electronic gaming device may include a memory and a processor. The memory may include a searching module. The searching module may include one or more of a plurality of predetermined searching structures and a search algorithm. The processor may obtain and/or receive gaming data from one or more devices (e.g., gaming device, gaming tables, etc.) based on at least one of a searching structure and the search algorithm. The processor may compare a betting criterion (and/or betting criteria) to the gaming data. The processor may initiate one or more processes, such as, a wager based on a comparison of the gaming criterion (or betting criterion) to the gaming data and/or a display of data related to a search result.

In another example, the processor may initiate the wager based on an account balance. In another example, the processor may initiate the wager based on a wager limit. In another example, the processor may initiate the wager based on a placed number of wagers.

In another example, the processor may initiate the wager may be based on one or more of the account balance, the wager limit, the number of placed wagers, any other betting criteria, and/or any other account criteria.

In an example, a method for providing gaming options may include obtaining gaming data from one or more devices (e.g., gaming devices, table games, etc.). The method may include comparing a betting criterion (and/or betting criteria) to the gaming data. The method may include initiating one or more procedures including: (1) a wager based on a comparison of the betting criterion (or gaming criterion) to the gaming data; and (2) a display of data related to a search result.

In another example, the initiation of the wager may be based on an account balance. In another example, the initiation of the wager may be based on a wager limit. In another example, the initiation of the wager may be based on a placed number of wagers.

In another example, the initiation of the wager may be based on one or more of the account balance, the wager limit, the number of placed wagers, any other betting, and/or account criteria.

In one embodiment, the electronic gaming device may further include a display. The display may display betting options based on a comparison of the betting criterion to the gaming data.

In one embodiment, the electronic gaming system may include a server memory and a server processor. The server memory may include a searching module. Utilizing the search module instructions, the processor can execute searches such as which table games paid out the most money during a time period, which table games kept the most money from players during a time period, which table games are most popular (top games), which table games are least popular, which table games have the most amount of money bet during a period, which table games have the highest bet volume, which table games are more volatile (volatility, or deviation from the statistical norms, of bet volume, bet amount, pay out, etc.) during a time period, and the like. Search may also be associated with location queries, time queries, and/or people queries (e.g., where are the table games that most of my friends bet on, where are my favorite dealers, what do players bet on the most today, when are most bets placed, etc.).

The searching module may include one or more predetermined searching structures and/or a search algorithm. The server processor may obtain gaming data from one or more gaming tables via a network interface, which may be based on at least one of a searching structure and the search algorithm. The server processor may compare a betting criterion to the gaming data. In addition, the server processor may initiate a wager based on a comparison of the betting criterion to the gaming data and/or display the data related to a search result on the one or more gaming tables (and/or any other device).

In other examples, the server processor may initiate the wager based on an account balance. The server processor may initiate the wager based on a wager limit. The server processor may initiate the wager based on a placed number of wagers.

As used herein, the term "mobile device" refers to a portable electronic device that may from time to time have a position that changes. Such changes in position may comprise changes to direction, distance, and/or orientation. In particular examples, a mobile device may comprise a cellular telephone, a tablet computer, a portable media player, wireless communication device, user equipment, laptop computer, other personal communication system ("PCS") device, personal digital assistant ("PDA"), personal audio device ("PAD"), portable navigational device, or other portable communication devices. A mobile device may also comprise a processor or computing platform adapted to perform functions controlled by machine-readable instructions.

The methodologies described herein may be implemented by various means depending upon applications according to particular examples. For example, such methodologies may be implemented in hardware, firmware, software, or combinations thereof. In a hardware implementation, for example, a processing unit may be implemented within one or more application specific integrated circuits ("ASICs"), digital signal processors ("DSPs"), digital signal processing devices ("DSPDs"), programmable logic devices ("PLDs"), field programmable gate arrays ("FPGAs"), processors, controllers, micro-controllers, microprocessors, electronic devices, other devices units designed to perform the functions described herein, or combinations thereof.

Similarly, the functions performed by various modules in the gaming device 100 or electronic gaming system 200 may be implemented in one or more remote servers in an alternative approach. For instance, modules 406-420 or servers 215-240 may each be on a remote server, communicating with gaming device 100 via a network interface such as Ethernet in a local or a wide area network topology. In some implementations, these servers may be physical servers in a data center. In some other implementations, these servers may be virtualized. In yet some other implementations, the functions performed by these modules and/or server may be implemented as web services. For example, the predetermined game options module 408 may be implemented in software as a web service provider. Gaming device 100 would make service requests over the web for the available predetermined bet options to be displayed. Regardless of how the modules and their respective functions are implemented, the interoperability with the gaming device 100 is seamless.

Some portions of the detailed description included herein are presented in terms of algorithms or symbolic representations of operations on binary digital signals stored within a memory of a specific apparatus or a special purpose computing device or platform. In the context of this particular specification, the term specific apparatus or the like includes a general purpose computer once it is programmed to perform particular operations pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Reference throughout this specification to "one example," "an example," "embodiment," and/or "another example" should be considered to mean that the particular features, structures, or characteristics may be combined in one or more examples.

While there has been illustrated and described what are presently considered to be example features, it will be understood by those skilled in the art that various other modifications may be made, and equivalents may be substituted, without departing from the disclosed subject matter. Additionally, many modifications may be made to adapt a particular situation to the teachings of the disclosed subject matter without departing from the central concept described herein. Therefore, it is intended that the disclosed subject matter not be limited to the particular examples disclosed.

The invention claimed is:

1. An electronic gaming device comprising:
a card reader configured to assist in identifying a player;
a memory including a plurality of contingent gaming options with respect to game outcome data from multiple live gaming tables hosting live table games that take place concurrently, wherein each live table game supports one or more wagers based on the live table game, a live dealer, and the use of one or more physical game objects for the play of the live table game; and
a processor configured to obtain in real time game outcome data for the live table games being played at the multiple live gaming tables via a network interface, the processor being configured to search for a triggering pattern in the obtained game outcome data, wherein the triggering pattern comprises a specific pattern of game outcomes over multiple live table games being played at a plurality of the multiple live gaming tables, the processor being further configured to initiate a contingent wager based on a detection of the triggering pattern in the obtained game outcome data, wherein the contingent wager is obtained from credits available to the player identified using the card reader.

2. The electronic gaming device of claim 1, wherein the contingent wager being initiated is based on an account balance.

3. The electronic gaming device of claim 1, wherein the contingent wager being initiated is limited by a predetermined wager limit.

4. The electronic gaming device of claim 3, wherein the processor is further configured to reduce the contingent wager to an amount at or below the predetermined wager limit.

5. The electronic gaming device of claim 1, wherein the contingent wager is limited such that it cannot exceed a certain percentage of an account balance of the player.

6. The electronic gaming device of claim 1, wherein the contingent wager is limited by a predetermined loss limit over a predetermined timeframe that is placed on the player.

7. The electronic gaming device of claim 1, wherein the contingent wager being initiated is based on a plurality of previously placed wagers.

8. The electronic gaming device of claim 1, wherein the multiple live gaming tables includes at least one of a baccarat table, a roulette table, a blackjack table, a poker table, a craps table, and a Sic Bo table.

9. The electronic gaming device of claim 1, wherein the specific pattern of game outcomes over the multiple live table games being played at the plurality of the multiple live gaming tables is dependent on game outcome from a plurality of different kinds of the multiple live table games.

10. The electronic gaming device of claim 1, wherein the plurality of live gaming tables comprise ten or more live gaming tables.

11. The electronic gaming device of claim 10, wherein the ten live gaming tables are all blackjack tables.

12. The electronic gaming device of claim 10, wherein the ten live gaming tables are all baccarat tables.

13. The electronic gaming device of claim 1, wherein the triggering pattern is specified in advance by a player.

14. The electronic gaming device of claim 1, wherein the plurality of contingent gaming options includes the triggering pattern.

15. The electronic gaming device of claim 1, wherein the processor is further configured to facilitate display of search results at one or more of the plurality of the multiple live gaming tables, one or more associated gaming devices, or both.

16. The electronic gaming device of claim 1, wherein the processor is further configured to facilitate display of search results at an associated gaming device according to preferences of a player.

17. A method of providing gaming options via an electronic gaming device comprising:
    collecting credits for use at the electronic gaming device, the electronic gaming device including a credit device configured to collect the credits by accepting physical cash or vouchers;
    obtaining, via a central server, game outcome data for a plurality of live table games played concurrently at multiple live gaming tables hosting live table games thereat that include a live dealer and the use of one or more physical game objects;
    searching, via the central server, for a triggering pattern in the obtained game outcome data, wherein the triggering pattern comprises a specific pattern of game outcomes over multiple concurrent ones of the plurality of live table games being played at a plurality of the multiple live gaming tables; and
    initiating, via the central server, a contingent wager based on a detection of the triggering pattern in the obtained game outcome data, the contingent wager being obtained from the credits that are at least in part made available to the player via the credit device.

18. The method of claim 17, wherein the contingent wager is based on an account balance.

19. The method of claim 17, wherein the method further comprises:
    limiting the contingent wager based on a wager limit.

20. The method of claim 17, wherein the contingent wager is based on a number of previously placed wagers.

21. The method of claim 17, wherein the plurality of live gaming tables includes at least one of a baccarat table, a roulette table, a blackjack table, a poker table, a craps table, and a Sic Bo table.

22. An electronic gaming system comprising:
    a credit device configured to collect credits for use at the electronic gaming device, the credit device being configured to collect the credits by accepting physical cash or vouchers;
    a processor configured to:
        obtain game outcome data in real time for a plurality of live table games played concurrently at a plurality of live gaming tables, wherein each of the plurality of live gaming tables are configured to host live table games that include a live dealer and the use of one or more physical game objects,
        search for a triggering pattern in the obtained game outcome data, wherein the triggering pattern comprises a specific pattern of game outcomes over multiple ones of the live table games being played at the plurality of live gaming tables, and
        activate a wager for a player when the triggering pattern is found, wherein the wager is obtained from the credits that are at least in part made available to the player via the credit device; and
    a display in communication with the processor, the display being configured to display betting statistics pertaining to one or more of the plurality of live table games at the plurality of live gaming tables.

23. The electronic gaming system of claim 22, wherein the betting statistics being displayed are provided in real-time.

24. The electronic gaming system of claim 22, wherein the betting statistics being displayed comprise aggregate betting statistics.

25. The electronic gaming system of claim 22, wherein the wager is a contingent wager.

26. The electronic gaming system of claim 22, wherein the display is located at or nearby one of the plurality of live gaming tables.

27. The electronic gaming system of claim 22, wherein the display is associated with a mobile device.

28. The electronic gaming system of claim 22, wherein the processor is further configured to facilitate the display of search results at one or more of the plurality of live gaming tables, one or more associated gaming devices, or both.

29. The electronic gaming system of claim 22, wherein the specific pattern of game outcomes over multiple ones of the live table games being played at the plurality of live gaming tables is dependent on game outcome from a plurality of different kinds of the multiple ones of the live table games.

* * * * *